United States Patent
Bryan et al.

(10) Patent No.: US 6,421,671 B1
(45) Date of Patent: Jul. 16, 2002

(54) METHOD AND SYSTEM FOR AUTOMATED DISTRIBUTION OF SOFTWARE

(75) Inventors: Joe Mark Bryan, Cedar Park; David Alan Butts; Roger W. Wong, both of Austin; William Paul Hyden, Round Rock, all of TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/303,167

(22) Filed: Apr. 30, 1999

(51) Int. Cl.[7] .............................................. G06F 17/30
(52) U.S. Cl. .......................................... 707/10; 707/203
(58) Field of Search ......................... 710/36; 713/190; 707/104, 3, 203, 10, 104.1, 202, 204, 313; 705/35

(56) References Cited

U.S. PATENT DOCUMENTS

| | | | |
|---|---|---|---|
| 5,689,706 A | 11/1997 | Rao et al. ................... 395/617 |
| 5,790,796 A | 8/1998 | Sadowsky ............... 395/200.51 |
| 5,806,078 A | * 9/1998 | Hug et al. .................. 707/511 |
| 5,809,248 A | 9/1998 | Vidovic ................ 395/200.49 |
| 5,819,274 A | 10/1998 | Jackson, Jr. ................. 707/10 |
| 5,835,911 A | * 11/1998 | Nakagawa et al. ......... 707/203 |
| 5,926,636 A | * 7/1999 | Lam et al. .................. 395/683 |
| 5,963,743 A | 10/1999 | Amberg et al. ............. 395/712 |
| 5,991,543 A | 11/1999 | Amberg et al. ............. 395/712 |
| 5,995,757 A | 11/1999 | Amberg et al. ............. 395/712 |
| 5,999,943 A | * 12/1999 | Nori et al. .................. 707/104 |
| 6,061,678 A | * 5/2000 | Klein et al. ..................... 707/3 |
| 6,098,078 A | * 8/2000 | Gehani et al. .............. 707/203 |
| 6,134,659 A | * 10/2000 | Sprong et al. ............. 713/190 |
| 6,151,643 A | * 11/2000 | Cheng et al. ................. 710/36 |
| 6,233,565 B1 | * 5/2001 | Lewis et al. .................. 705/35 |

OTHER PUBLICATIONS

Pending Patent Application: Richard D. Amberg, Roger W. Wong, Michael A. Brundridge; "Software Installation and Testing for a Build–to–Order Computer System"; Dell USA, L.P.

Pending Patent Application: John Odendahl; "Technique for Performing Factory Installation of Software"; Dell USA, L.P.

(List continued on next page.)

Primary Examiner—Jean M. Corrielus
Assistant Examiner—Tam Nguyen
(74) Attorney, Agent, or Firm—Baker Botts L.L.P.

(57) ABSTRACT

A method and system for automated distribution of software are provided. The method comprises maintaining a database of configuration information. The configuration information includes version information of loaded software stored on a remote server. The configuration information further includes version information of available software operable to be loaded upon the remote server. A request is received from a user to load the available software on the remote server. The version information of the available software is compared with the version information of the loaded software. The available software is copied to the remote server.

16 Claims, 2 Drawing Sheets

OTHER PUBLICATIONS

Pending Patent Application: Richard D. Amberg, Roger W. Wong, Michael A. Brundridge; "Software Installation and Testing for a Build–to–Order Computer System"; Dell USA, L.P.

Pending Patent Application: Richard D. Amberg, Roger W. Wong, Michael A. Brundridge; "Database for Facilitating Software Installation and Testing for a Build–to–Order Computer System"; Dell USA, L.P.

Pending Patent Application: Alan E. Beelitz, Richard D. Amberg; "Recoverable Software Installation Process and Apparatus for a Computer System"; Dell USA, L.P.

Pending Patent Application: Anil V. Rao, Wayne R. Weilnau; "System and Method for Installing System Manufacturer Provided Software"; Dell USA, L.P.

Pending Patent Application: Roy W. Stedman, James McGlothlin; "Factory Installing Desktop Components for an Active Desktop"; Dell USA, L.P.

Pending Patent Application: Richard D. Amberg, Roger Wong, Michael Lynch; "A Method of Installing Software on and/or Testing a Computer System"; Dell USA, L.P.

Pending Patent Application Ser. No. 09/984,357 filed by John Odendahl; "Technique for Performing Factory Installation of Software"; Dell USA, L.P. Dec. 3, 1997.

Pending Patent Application Ser. No. 09/236,862: Alan E. Beelitz, Richard D. Amberg; "Recoverable Software Installation Process and Apparatus for a Computer System"; Dell USA, L.P. Jan. 25, 1999.

Pending Patent Application Ser. No. 09/271,581 filed by Anil V. Rao, Wayne R. Weilnau; "System and Method for Installing System Manufacturer Provided Software"; Dell USA, L.P.Mar. 18, 1999.

Pending Patent Application Ser. No. 09/169,324 filed by Roy W. Stedman, James McGlothlin; "Factory Installing Desktop Components for an Active Desktop"; Dell USA, L.P. Oct. 9, 1998.

Pending Patent Application Ser. No. 09/237,760 filed by Richard D. Amberg, Roger Wong, Michael Lynch; "A Method of Installing Software on and/or Testing a Computer System"; Dell USA, L.P. Jan. 26, 1999.

* cited by examiner

METHOD AND SYSTEM FOR AUTOMATED DISTRIBUTION OF SOFTWARE

TECHNICAL FIELD OF THE INVENTION

The present invention relates in general to the distribution of software and, more particularly, to a method and system for automated distribution of software.

BACKGROUND OF THE INVENTION

A build-to-order process allows a customer to choose the configuration of a purchased system. With respect to a computer system, the configuration dictated by the customer can include various software options. The software options include, for example, operating systems, device drivers and application programs, in many different languages. In such a process, the customer orders a computer built to his specifications that includes particular software. A customer's order is transmitted to the factory floor, where the computer system is assembled. The software is then loaded upon the computer system and the computer system is shipped to the customer.

In order to give customers a wide variety of possible configurations, it is necessary to maintain a large number of software packages. These packages must be accessible from the factory floor. The factory floor may include a file server, for example, that is used to load the particular software configuration upon the computer system ordered by the customer.

In addition to maintaining the software for installation on the factory floor, there are many other needs within a company for the software. For example, a validation department and/or a pilot department may need to test the software before it is made available for installation onto a customer system. Each of these departments may include a separate file server used to maintain the different software packages.

Therefore, a company instituting such a build process copies the particular files that make up a software package to various servers throughout the company for use by various persons.

An automated process can facilitate the movement of such files. For example, DELL COMPUTER CORPORATION uses an automated system called the AFPFan. The AFPFan receives a request to copy, or "promote," software to a remote server or multiple remote servers. The AFPFan then copies the software to a local cache and distributes the software to the remote server(s). The AFPFan can multi-thread the write process to expedite the promotion of the software.

With the use of automated processes, however, there has arisen a problem of configuration management. As different persons request the software (development, validation, factory, etc.), it is possible that these requests will copy older versions of the software over newer versions of the software. This, in turn, can lead to further problems. For example, if a worker on the factory floor requests and copies an obsolete device driver onto a newer device driver, then it is possible an incorrectly configured system would be shipped.

Conventional attempts to resolve such a situation are problematic. One conventional system includes manually tracking the software, versions, and each server the software is loaded upon. Such a solution is unworkable as the number of software packages grows. Additionally, as more than one user may have access to the various software, maintaining a single list becomes problematic.

Another conventional system involves a batch process that connects a network drive to the target servers. The batch process checks to ensure older files will not copy over newer files. For example, DELL COMPUTER CORPORATION instituted such a process. This system reduces many of the problems of manual tracking. However, this batch process requires a user to check the results of the batch process manually. This in turn lengthens the amount of time required to promote the software. Additionally, the time lag between the request for promotion and the checking of the result of the batch process can allow crossing or conflicting requests. That is, two users may unknowingly make conflicting promotion requests.

SUMMARY OF THE INVENTION

In accordance with the present invention, a method and system for automated distribution of software are disclosed that provide significant advantages over prior developed software distribution systems.

In one aspect of the present invention, a computer implemented method comprises maintaining a database of configuration information. The configuration information includes version information of loaded software stored on a remote server. The configuration information further includes version information of available software that is operable to be loaded upon the remote server. A request is received from a user to load the available software onto the remote server. The version information of the available software is compared with the version information of the loaded software. The available software is copied to the remote server.

In another aspect of the present invention, a system for automated distribution of software comprises a database of configuration information maintained on a computer readable medium. The configuration information includes version information of loaded software stored on a remote server. The configuration information further includes version information of available software that is operable to be loaded upon the remote server. A request page is operable to receive a request from a user to load the available software onto the remote server. A pre-processor interfaces to the database and the request page, the pre-processor operable to compare the version information of the available software with the version information of the loaded software. The pre-processor is further operable to allow the user to terminate or continue if the available software will corrupt the loaded software. A distribution engine interfaces with the pre processor and is operable to copy the available software onto the remote server.

It is a technical advantage of the present invention that it can prevent the inadvertent replacement of current software with obsolete software. This in turn allows for a more productive factory by reducing the time and costs associated with remedying an inadvertent replacement of current software.

It is another technical advantage of the present invention that it can maintain user logs of electronic signatures. In the event a problem occurs, it thus becomes easier to diagnose and correct.

It is a further technical advantage of the present invention that it can provide immediate feedback to a user if a request will corrupt software currently loaded upon the remote server. This can reduce or eliminate the problems of conflicting requests.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
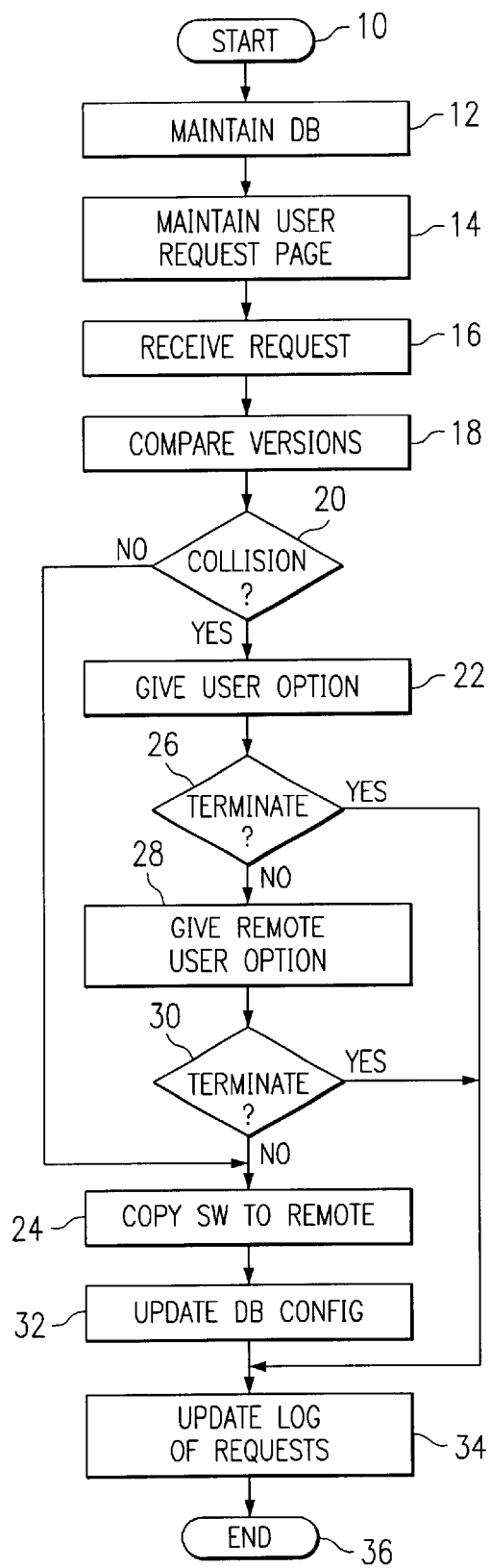
FIG. 1 is a flow diagram of one embodiment of a method for automated distribution of software according to the present invention.

FIG. 1 is a flow diagram of one embodiment of a method for automated distribution of software according to the present invention. The method begins at step 10. At step 12, a database of configuration information is maintained. The configuration information includes version information of loaded software stored on a remote server. For example, the version information could comprise a particular version of a software package. The remote server can be, for example, a file server located on a factory floor. The configuration information further includes version information of software that is available to the remote server and operable to be loaded upon the remote server ("available software").

At step 14, a user request page is maintained. For example, the user request page can comprise a Hyper Text Mark-up Language ("HTML") document available over a network to a user using a web browser. At step 16, a user request is received. The request is a request to move the available software onto the remote server.

At step 18, the database that is maintained by step 12 is accessed. The version information of the available software is compared with the version information of the loaded software. At step 20, it is determined if there is a collision. For example, a collision could result if the available software that the user requested to be copied onto the remote server will replace or otherwise corrupt the loaded software. Alternatively, the present invention contemplates that various other collision conditions could be defined by a user. If there is no collision, the method proceeds to step 24 where the software is copied to the remote server.

If there is a collision at step 20, the method moves to step 22 where the user is given the option of either terminating the distribution of the software or continuing distribution of the software despite the collision. At step 26, the user decides whether or not to terminate the distribution. If the user decides to terminate, the method proceeds to step 34. If the user decides to continue, the method proceeds to step 28.

At step 28, a remote user is given the option to terminate the distribution process despite the order to continue by the requesting user. Such a step may be useful in a factory context. For example, a user may request that software be copied to the remote server on the factory floor despite the discovery of a collision by steps 18 and 20. However, the user that decided to ignore the collision may not have access to all the information necessary to make such a decision. At step 28, a remote user on the factory floor can determine if the software should in fact be copied to that remote server. If the remote user decides at step 30 to terminate, the method continues to step 34. If the remote user decides at step 30 to continue, the method proceeds to step 24.

In step 24, the software is copied to the remote server. At step 32, the database is updated. For example, the version information of the software recently loaded upon the remote server can be entered into the database. At step 34, a log is updated of user request. Such a log can comprise electronic signatures of the users making requests and/or decisions in the current method. The method ends at step 36.

Figure 2:
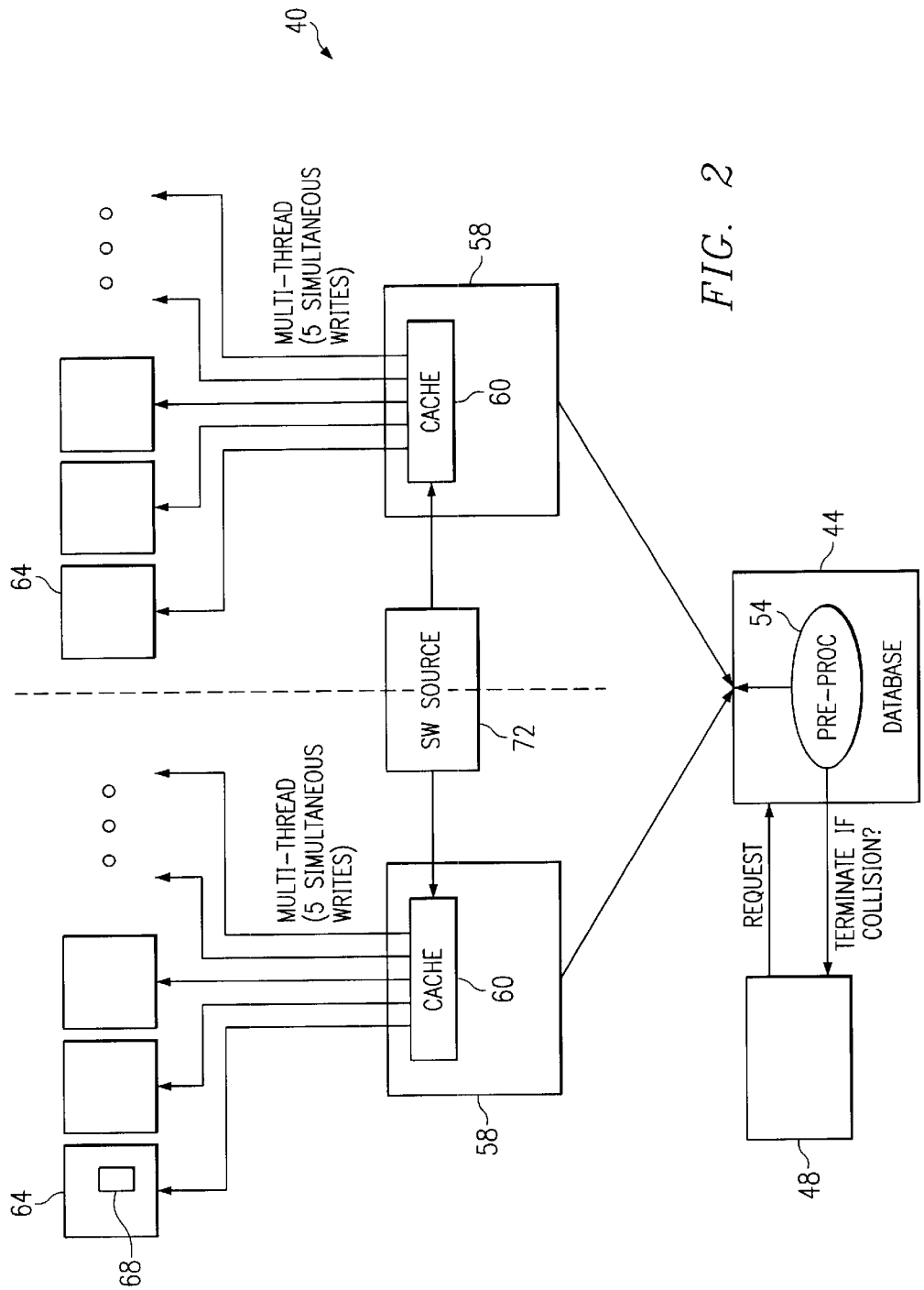
FIG. 2 is a block diagram of one embodiment of a system for automated distribution of software according to the present invention.

FIG. 2 is a block diagram of one embodiment of a system, indicated generally at 40, for automated distribution of software according to the present invention. System 40 comprises a request page 48. For example, the request page can be an HTML document accessible by a user over a network using a web browser. System 40 further includes database 44. Database 44 is maintained on computer readable medium and includes version information of loaded software stored on a remote server. Database 44 further includes version information of available software operable to be loaded upon a remote server. A pre-processor 54 interfaces with database 44 and request page 48. A distribution engine 58 interfaces with pre-processor 54. The embodiment of FIG. 2 includes multiple distribution engines 58. Distribution engine 58 includes cache 60 which interfaces with a software source 72. Remote servers 64 interface with cache 60.

In operation, request page 48 can receive a request from a user to load available software onto remote server 64. For example, remote server 64 may be a file server located on a factory floor, and the user may be requesting a certain software package to be promoted to the factory file server. Pre-processor 54 interfaces with request page 48 and receives the request. Pre-processor 54 then interfaces with database 44 and compares the version information of the software loaded upon remote server 64 with the version information of the available software which the user has requested to be loaded upon remote server 64. In one embodiment, pre-processor 54 comprises an SQL stored procedure integrated with database 44. Pre-processor 54 receives the request from request page 48 and searches database 54 to determine if copying the available software to remote server 64 will create a collision with the software stored on remote server 64. For example, a collision would occur if the available software would overwrite or otherwise corrupt the loaded software (e.g., software 68) on remote server 64.

If the pre-processor 54 determines that there will be a collision between the available software and the loaded software, pre-processor 54 halts the operation to give the user the opportunity to terminate the file distribution or to continue a file distribution.

If the user determines to continue, or if there is no collision, distribution engine 58 then continues the process. Distribution engine 58 can comprise, for example, executable code running on a network server, file server, or other computing platform. Distribution engine 58 determines software source 72 where the available software currently resides. Distribution engine 58 loads available software into cache 60, creates a connection to remote server 64, and loads the available software from cache 60 to remote server 64.

Further shown in the embodiment of FIG. 2, distribution engines 58 may simultaneously distribute the available software from cache 60 to multiple remote servers 64. For example, distribution engine 58 can multi-thread write to five remote servers 64. Furthermore, as seen by FIG. 2, the present invention can support multiple distribution engines 58.

Although the present invention has been described in detail, it should be understood that various changes, substitutions and alterations can be made thereto without departing from the spirit and scope of the invention as defined by the appended claims.

What is claimed is:

1. A system for validating distribution of software, the system comprising:

a database that includes configuration information which identifies a version of a loaded software package as residing on a remote server and a version of an available software package as residing on a software source;

a pre-processor that:

receives a request from a user to load the available software package from the software source onto the remote server;

in response to the request, automatically determines whether the loaded software package is newer than the available software package, by comparing the version of the loaded software package in the database with the version of the available software package in the database; and in response to determining that the loaded software package is newer than the available software package, automatically prompts the user to select between terminating the request and overwriting the more recent version; and a distribution engine that interfaces with the pre-processor and loads the available software package onto the remote server only if the user selects to overwrite the more recent version, such that the system prevents inadvertent replacement of newer software with older software.

2. The system of claim 1, wherein the distribution engine automatically updates version information in the database of configuration information to keep the version information current, in response to loading the available software package onto the remote server.

3. The system of claim 1, wherein:

the user comprises a first user;

in response to the first user selecting to overwrite the more recent version, the pre-processor automatically prompts a second user to select between approving the request and terminating the request; and the distribution engine loads the available software package onto the remote server only if the first user selects to overwrite the more recent version and the second user selects to approve the request.

4. The system of claim 1, wherein the distribution engine maintains a log of the users making requests by recording an electronic signature of the user in response to the user selecting to overwrite the more recent version.

5. The system of claim 1, wherein the pre-processor comprises a stored SQL procedure.

6. The system of claim 1, wherein the pre-processor uses a request page that is accessible through a web browser to prompt the user to select between terminating the request and overwriting the more recent version.

7. The system of claim 1, wherein:

the remote server comprises one of multiple remote servers;

the software source comprises a file server among multiple file servers; and the database includes version information for installed software packages residing on the multiple remote servers and version information for available software packages residing on the multiple file servers.

8. The system of claim 1, wherein:

the remote server comprises one of multiple remote servers; and the distribution engine loads the available software package by:

loading the available software package from the software source to a local cache;

establishing connections between the local cache and the multiple remote servers; and loading the available software package from the local cache to the multiple remote servers substantially simultaneously.

9. A computer implemented method for validating distribution of software, the method comprising:

receiving, from a user, a request to load an available software package from a software source onto a remote server;

in response to the request, automatically determining whether a loaded software package on the remote server is newer than the available software package on the software source, by consulting a database that includes configuration information which identifies a version of the available software package as residing on the software source and a version of the loaded software package as residing on the remote server;

in response to determining that the loaded software package is newer than the available software package, automatically prompting the user to select between terminating the request and overwriting the more recent version; and loading the available software package onto the remote server only if the user selects to overwrite the more recent version, such that the method prevents inadvertent replacement of newer software with older software.

10. The method of claim 9, further comprising, in response to loading the available software package onto the remote server, automatically updating version information in the database of configuration information to keep the version information current.

11. The method of claim 9, wherein:

the user comprises a first user;

the method further comprises, in response to the first user selecting to overwrite the more recent version and before the loading operation, automatically prompting a second user to select between approving the request and terminating the request; and the operation of loading the available software package onto the remote server is performed only if the first user selects to overwrite the more recent version and the second user selects to approve the request.

12. The method of claim 9, further comprising maintaining a log of the users making requests by recording an electronic signature of the user in response to the user selecting to overwrite the more recent version.

13. The method of claim 9, further comprising:

providing the user with a request page that receives load requests by transmitting the request page to a web browser for display; and wherein the operation of receiving the request from the user comprises receiving user input entered into the request page.

14. The method of claim 9, wherein:

the remote server comprises one of multiple remote servers; and the operation of loading the available software package comprises:

loading the available software package from the software source to a local cache;

establishing connections between the local cache and the multiple remote servers; and loading the available software package from the local cache to the multiple remote servers substantially simultaneously.

15. The method of claim 11, further comprising maintaining a log of the users making and approving requests by recording an electronic signature of the first user in response to the first user selecting to overwrite the more recent version and recording an electronic signature of the second user in response to the second user selecting to approve the request.

16. The system of claim 3, wherein the distribution engine maintains a log of the users making and approving requests by recording an electronic signature of the first user in response to the first user selecting to overwrite the more recent version and recording an electronic signature of the second user in response to the second user selecting to approve the request.

* * * * *

UNITED STATES PATENT AND TRADEMARK OFFICE
CERTIFICATE OF CORRECTION

PATENT NO.     : 6,421,671 B1
DATED          : July 16, 2002
INVENTOR(S)    : Joe Mark Bryan et al.

It is certified that error appears in the above-identified patent and that said Letters Patent is hereby corrected as shown below:

<u>Title page,</u>
Item [*] Notice, please add the following:

-- This patent issued on a continued prosecution application filed under 37 CFR 1.53(d), and is subject to the twenty year patent term provisions of 35 U.S.C. 154(a)(2). --

Signed and Sealed this

Seventh Day of January, 2003

JAMES E. ROGAN
*Director of the United States Patent and Trademark Office*